US008458797B1

(12) United States Patent
Yu et al.

(10) Patent No.: US 8,458,797 B1
(45) Date of Patent: Jun. 4, 2013

(54) SYSTEM AND METHOD FOR SECURING COMPUTERS AGAINST COMPUTER VIRUSES

(75) Inventors: Kai Yu, Nanjing (CN); Chih-Ming Chen, Taipei (TW); Yi-Fen Chen, Pasadena, CA (US)

(73) Assignee: Trend Micro Incorporated, Tokyo (JP)

( * ) Notice: Subject to any disclaimer, the term of this patent is extended or adjusted under 35 U.S.C. 154(b) by 3278 days.

(21) Appl. No.: 10/811,501

(22) Filed: Mar. 25, 2004

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ............. 726/24; 726/13; 726/22; 726/23; 726/25; 726/26; 713/156; 713/166; 713/167; 713/187; 713/188; 709/223; 709/224

(58) Field of Classification Search
USPC .......................................................... 726/24
See application file for complete search history.

(56) References Cited

U.S. PATENT DOCUMENTS

| | | |
|---|---|---|
| 5,442,699 A | 8/1995 | Arnold et al. |
| 5,452,442 A | 9/1995 | Kephart |
| 5,907,834 A | 5/1999 | Kephart et al. |
| 6,192,512 B1 | 2/2001 | Chess |
| 6,279,128 B1 | 8/2001 | Arnold et al. |
| 6,622,134 B1 | 9/2003 | Sorkin |
| 6,711,583 B2 | 3/2004 | Chess et al. |
| 6,789,200 B1 | 9/2004 | Fiveash et al. |
| 6,813,712 B1 | 11/2004 | Luke |
| 2002/0095593 A1* | 7/2002 | Daniell et al. ............. 713/200 |
| 2003/0051154 A1* | 3/2003 | Barton et al. ............. 713/201 |
| 2005/0182967 A1* | 8/2005 | Phillips et al. ............ 713/201 |
| 2006/0053490 A1* | 3/2006 | Herz et al. ................ 726/23 |
| 2006/0080120 A1* | 4/2006 | Tcherevik ................. 705/1 |

FOREIGN PATENT DOCUMENTS

| | | |
|---|---|---|
| EP | 1 377 892 B1 | 9/2004 |
| WO | WO 02/084459 A1 | 10/2002 |

* cited by examiner

*Primary Examiner* — Nathan Flynn
*Assistant Examiner* — Bryan Wright
(74) *Attorney, Agent, or Firm* — Okamoto & Benedicto LLP (57) ABSTRACT

In one embodiment, an antivirus mechanism (e.g., antivirus program) in a computer initiates shielding procedures in response to a triggering event indicative of a presence of a virus in the computer, the virus being of a type not recognized by the antivirus program. The shielding procedures advantageously protect important components of the computer while the antivirus program does not have the requisite antidote to directly deal with the virus.

36 Claims, 5 Drawing Sheets

SYSTEM AND METHOD FOR SECURING COMPUTERS AGAINST COMPUTER VIRUSES

BACKGROUND OF THE INVENTION

1. Field of the Invention

The present invention relates generally to computer systems, and more particularly but not exclusively to antivirus programs.

2. Description of the Background Art

The threat posed by computer viruses to computer systems is well documented. A computer virus can corrupt or delete important files, send e-mails without user authorization, render a computer inoperable, or cause other types of damage to a computer. Computers may incorporate antivirus programs as a protective measure against viruses. A typical antivirus program uses a pattern file to scan a computer for viruses. The pattern file includes the patterns (also referred to as "signatures") of known viruses. Generally speaking, the antivirus program uses the pattern file as a reference in determining if data, such as those in files, contain a virus. Antivirus programs, including their pattern files, are continually updated to keep up with new viruses. The updates may be delivered over a computer network, such as the Internet, or distributed using removable computer-readable storage medium, such as a CD-ROM or floppy disk.

Antivirus research laboratories have been set up to look for computer virus outbreaks. Once a computer virus is identified, computer scientists race to develop an "antidote" for the virus. The antidote may comprise an update to an antivirus program, such as an updated pattern file or antivirus engine. However, it may take some time before an antidote is developed and distributed to infected computers.

SUMMARY

In one embodiment, an antivirus mechanism (e.g., antivirus program) in a computer initiates shielding procedures in response to a triggering event indicative of a presence of a virus in the computer, the virus being of a type not recognized by the antivirus program. The shielding procedures advantageously protect important components of the computer while the antivirus program does not have the requisite antidote to directly deal with the virus.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
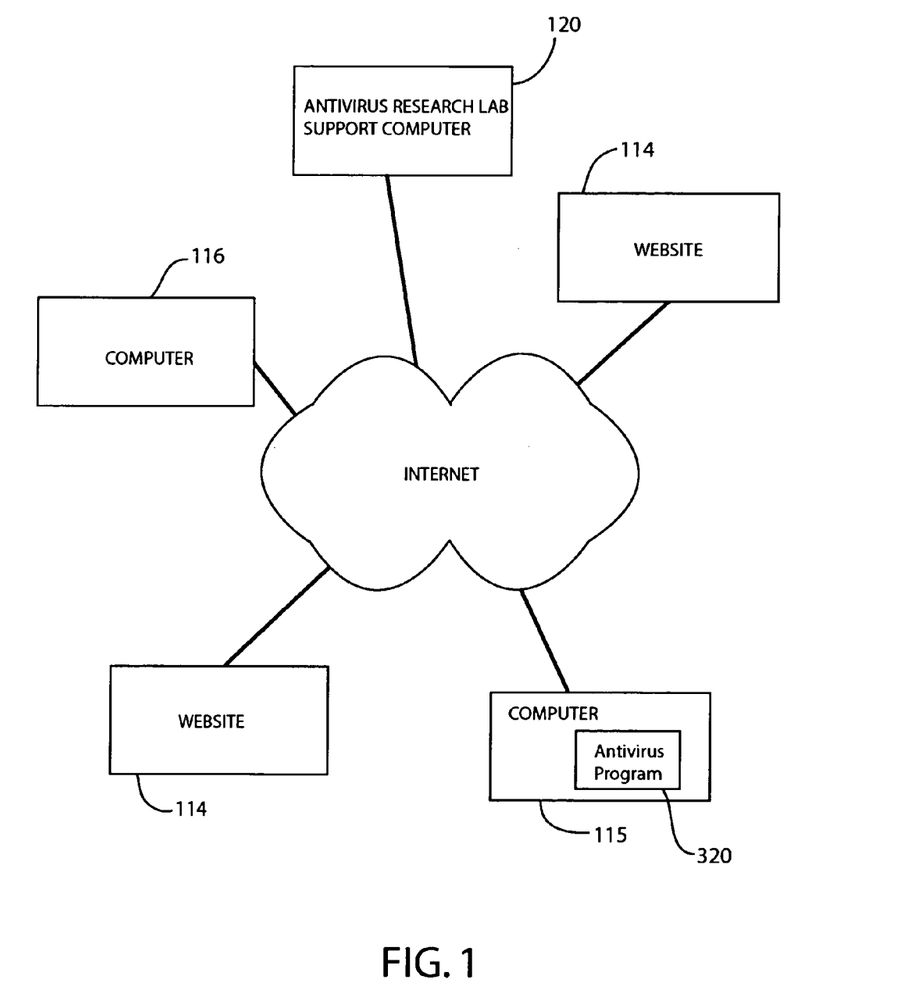
FIG. 1 shows a schematic diagram of a computer network in accordance with an embodiment of the present invention.

FIG. 1 shows a schematic diagram of a computer network in accordance with an embodiment of the present invention. In the example of FIG. 1, the network includes the following computers that are interconnected over the Internet: one or more websites 114, one or more support computers 120, and one or more computers 116 and 115. A computer 116 or 115 may be any type of computer capable of receiving data over a computer network or a local storage device. In one embodiment, a computer 116 or 115 is a desktop computer, such as a personal computer employed by a user to surf or receive data over the Internet. For example, a user on computer 116 may send an e-mail to a user on computer 115 over the Internet. As another example, computer 115 may receive updates for a resident antivirus program 320 from a support computer 120 also over the Internet. It is to be noted that the Internet is being used herein merely as an example, not a limitation on the present invention.

A website 114 may comprise a server computer containing web pages for viewing by users surfing on the Internet. For example, a user on computer 115 may employ a web browser 336 (see FIG. 3) to view web pages off a website 114. Besides providing web pages, a website 114 may also download executable code (e.g., script, plug-in) to computer 115. The ability of an executable code from a website 114 to run in computer 115 depends on a security level of web browser 336. For example, the security level of web browser 336 may be set such that executable code from a website 114 is not allowed to run or be received in computer 115.

Support computer 120 may be a computer maintained by an antivirus research laboratory. An example of such a laboratory is the TrendLabs™ global antivirus research and support center, which is part of Trend Micro, Inc. of Tokyo, Japan. An antivirus research laboratory studies and looks for computer viruses. Upon discovering a computer virus, the laboratory prepares an antidote to prevent the spread of the virus or to disinfect computers already infected by the virus. The laboratory may also send a "virus alert" or "virus outbreak notification" to computers that subscribe to the services of the laboratory. In on embodiment, computer 115 subscribes to the services of the virus research laboratory maintaining support server computer 120. Accordingly, computer 115 may receive antidotes and virus outbreak notifications from support server computer 120. An antidote may be an update to one or more components of antivirus program 320, for example.

Figure 2:
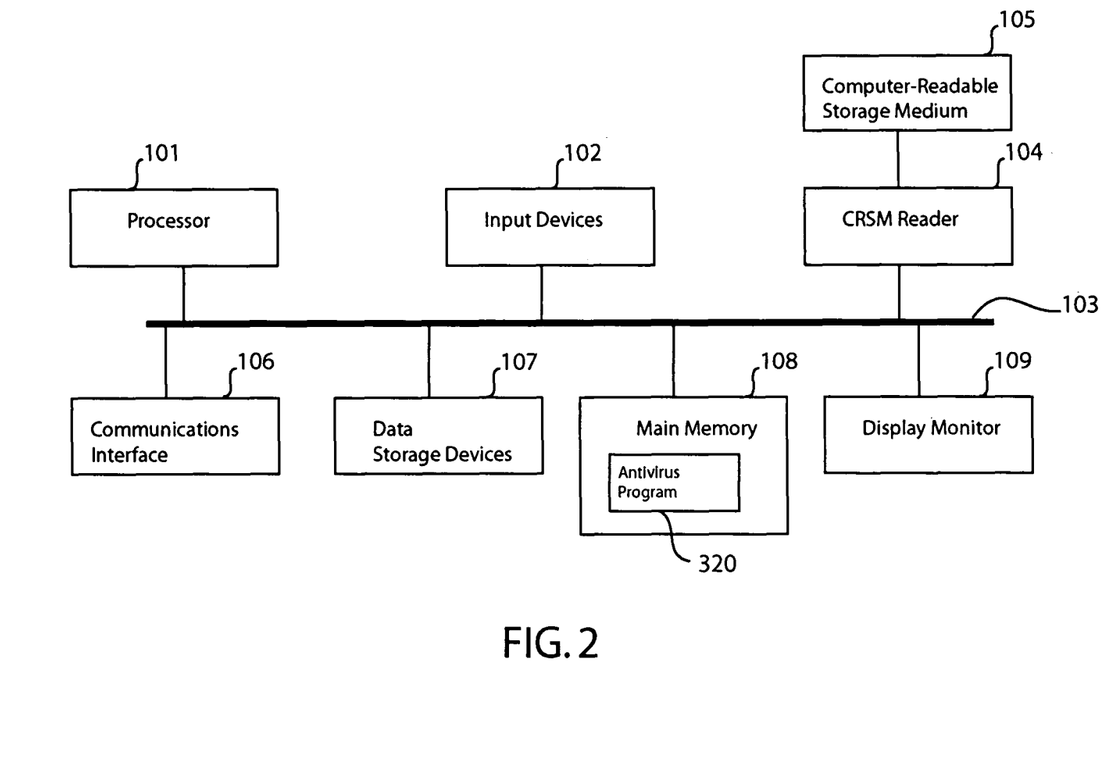
FIG. 2 shows a schematic diagram of an example computer that may be used in embodiments of the present invention.

Referring now to FIG. 2, there is shown a schematic diagram of an example computer that may be used in embodiments of the present invention. Depending on its configuration, the computer shown in the example of FIG. 2 may be employed as a desktop computer, an appliance, or a server computer, for example. In one embodiment, the computer of FIG. 2 is employed as a computer 115. The computer of FIG. 2 may have less or more components to meet the needs of a particular application. As shown in FIG. 2, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. In the example of FIG. 2, main memory 108 may be configured to include an antivirus program 320, which is further discussed below. An antivirus program 320 may be executed by processor 101.

Figure 3:
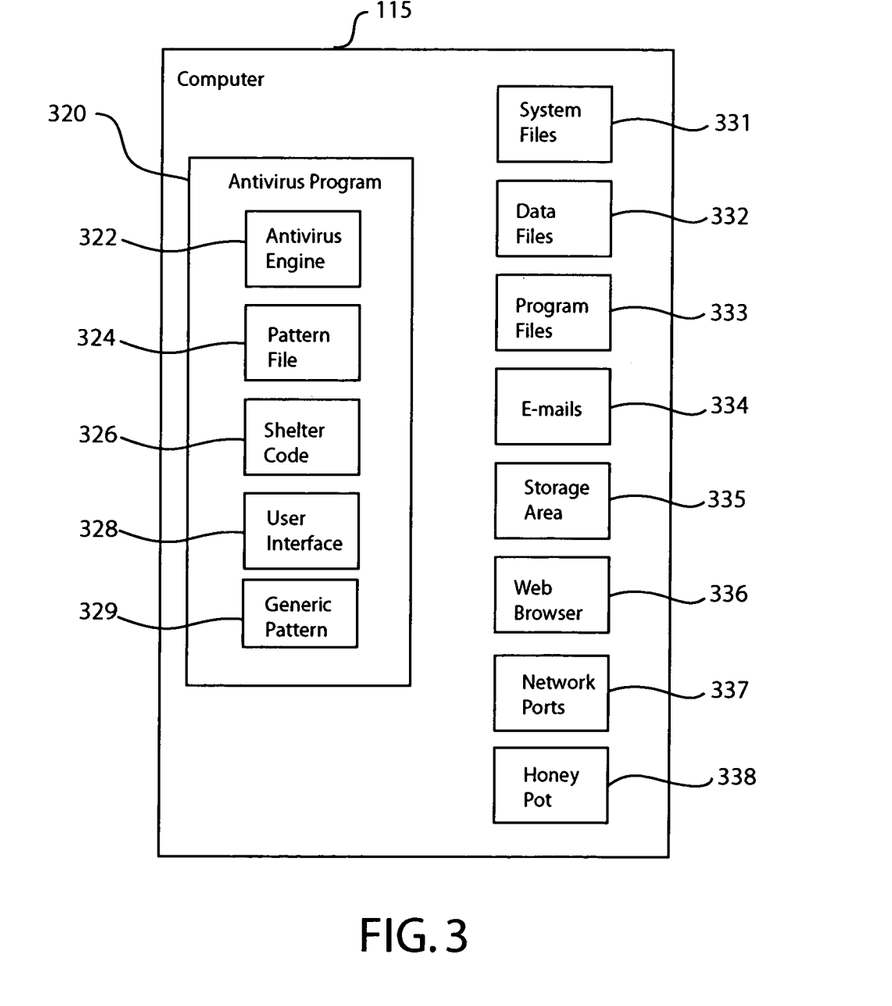
FIG. 3 schematically shows the components of a computer in accordance with an embodiment of the present invention.

FIG. 3 schematically shows the components of a computer 115 in accordance with an embodiment of the present invention. In the example of FIG. 3, computer 115 may include an antivirus program 320, system files 331, data files 332, program files 333, e-mails 334, storage area 335, web browser 336, network ports 337, and honey pot 338.

System files 331 may comprise files employed in the general operation of computer 115, such as those employed by the operating system (not shown). An example system file 331 is a system registry, which in a computer 115 running the Microsoft Windows™ operating system is also referred to as the "windows registry." A registry may contain settings and extended information for both application and system programs. System files 331 are important components of computer 115 in that they affect the general operation of the computer. A corrupted (e.g., damaged, removed, or inaccessible) system file 331 may result in boot-up errors, prevent application programs from running, or cause other problems that would prevent computer 115 from functioning properly.

Data files 332 may comprise files containing user data, such as word processing files, spreadsheet files, project management files, drawing files, and the like. Program files 333 may comprise application programs, such as word processing programs, spreadsheets, drawing programs, and so on. E-mails 334 may comprise those sent from or received in computer 115.

Storage area 335 may comprise main memory or data storage device locations. Example storage area 335 that may contain particularly important data includes disk boot sectors, disk mapping sectors, and main memory locations employed by the operating system.

Web browser 336 may be a commercially available web browser, such as the Microsoft Internet Explorer™ web browser. Web browser 336 may have a configurable security setting to put it at various security levels. The security level of web browser 336 indicates whether the web browser would allow downloads, running of ActiveX controls, and so on. For example, web browser 336 may be placed at a high security level to prevent all executable code from a website 114 from running in computer 115. As another example, web browser 336 may be placed at an intermediate security level to allow some types of executable code to run but not others.

Network ports 337 may comprise connection ports for communicating over a computer network, such those employed for TCP or UDP connections. Examples of network ports 337 include "port 80," which is generally used for World Wide Web communication, and "port 25," which is generally used for SMTP (simple mail transfer protocol) communication.

Honey pot 338 may comprise data used as "bait" for computer viruses. For example, honey pot 338 may be a file that is used solely by antivirus program 320. In other words, a user or program is not expected to access that file. Antivirus program 320 may periodically check that file for unexpected access (e.g., modification of that file). Access to that file by other than antivirus program 320 may indicate the presence of a virus in computer 115. As another example, honey pot 338 may be an entry in a system registry. That entry may be for the sole use of antivirus program 320. Thus, unexpected modification of that entry by other than antivirus program 320 may indicate the presence of a virus in computer 115. As will be more apparent below, honey pot 338 advantageously allows for automatic, local triggering of shelter code 326.

In the example of FIG. 3, antivirus program 320 may comprise an antivirus engine 322, a pattern file 324, a shelter code 326, and a user interface 328. As will be more apparent below, antivirus program 320 may later receive a generic pattern 329 as a temporary protective measure against an unknown virus. Generic pattern 329 may be a separate pattern file or incorporated in pattern file 324.

Antivirus engine 322 may comprise computer-readable program code for detecting and removing viruses. Antivirus engine 322 works in conjunction with pattern file 324, which contains the patterns of know viruses. The patterns may be behavioral patterns (e.g., multiple attempts to access a particular network port, access to certain types of files) or data-oriented patterns (e.g., particular combination of data bits, signature pattern), for example. As a particular example, antivirus program 320 may compare the contents of an e-mail attachment to patterns in pattern file 324 to determine if a virus is present in the attachment. Generally speaking, antivirus program 320 may use pattern file 324 in scanning incoming data or those already in computer 115 to determine if the data contain a virus. Instructions or algorithms for dealing with detected viruses may be in pattern file 324, incorporated in antivirus engine 322, or in other components of antivirus program 320. It is to be noted that the mechanics of scanning data for viruses and removing detected viruses, in general, is known in the art and not further described here.

New viruses are continually created and released from all over the world. A virus may enter a computer from various access points including by way of e-mail, files received over the Internet, removable computer-readable storage medium, and so on. To be effective against a virus, an antivirus program must be able to detect the virus. Put another way, an antivirus program is generally ineffective against a virus that is of a type not recognized by the antivirus program. To overcome this limitation, vendors periodically distribute antidotes to their customers. An antidote may be distributed over a computer network, such as the Internet, or by way of a removable computer-readable storage medium. An antidote, which allows an antivirus program to identify and remove new viruses, may be an update to an antivirus engine, a pattern file, or other components of the antivirus program. Because some viruses spread quickly and are extremely malicious, any delay in receiving antidotes may result in irreversible damage to infected computers.

Shelter code 326 may comprise computer-readable program code for securing a computer against a virus not recognizable by antivirus program 320. Shelter code 326 advantageously provides stopgap measures that minimize the effect of a virus prior to receiving an antidote in computer 115. Generally speaking, shelter code 326 raises a "shield" to protect computer 115 in situations where antivirus program 320 is ineffective against a virus. Shelter code 326 may raise the shield upon detection of a triggering event that is indicative of a presence of a virus.

The triggering event may comprise an alert from outside computer 115. For example, antivirus program 320 may receive a virus outbreak notification from support computer 120 (see FIG. 1) or other sources. The triggering event may be manually generated by a user. For example, a user may click on a button on user interface 328 to command shelter code 326 to secure the computer. Depending on implementation, a user may also manually generate a triggering event by so commanding shelter code 326 over a computer network. The user may generate a triggering event if she notices unusual operation of computer 115 (e.g., corrupted files, unauthorized e-mails being automatically sent to individuals in her calendar/contacts program) or if she has learned of a virus outbreak (e.g., notification from antivirus program vendor, news coverage), for example. The triggering event indicative of a presence of a virus may also be automatically generated. For example, antivirus program 320 may continually monitor virus "baits," such as a honey pot 338. A honey pot 338 may be file or other component designated for exclusive use by antivirus program 320. Therefore, access to the honey pot 338 by other than antivirus program 320 may indicate a presence of a virus in computer 115.

The triggering event indicative of a presence of a virus may also be automatically generated by antivirus engine 322. In one embodiment, antivirus engine 322 sends an infected honey pot 338 to the antivirus research laboratory. The infected honey pot provides an observable sample of the effect of the unknown virus, and may thus be employed to learn more about the virus. The infected honey pot may be analyzed to generate a "generic pattern" for use by antivirus engine 322. For example, the antivirus research laboratory may compare the infected honey pot and other observed information to a knowledge base manually or using an analysis program. The generic pattern does not have to be a full solution, and may simply be a general signature of the unknown virus with instructions on what to do depending on the suspected type of the unknown virus. This allows the generic pattern to be developed relatively fast compared to an antidote. The generic pattern may be provided to computer 115 for use by antivirus engine 322 as soon as it is available. In the example of FIG. 3, the generic pattern is labeled as "generic pattern 329." Generic pattern 329 may be incorporated in pattern file 324 (in that case a new pattern file 324 with the generic pattern is provided to computer 115), or in a separate pattern file. Although generic pattern 329 may not allow antivirus engine 322 to fully combat the virus, generic pattern 329 allows antivirus engine 322 to minimize the attacks, cloning, and spreading of the unknown virus while a specific pattern (i.e., an antidote) for ultimately killing the virus is being developed. That is, generic pattern 329 does not fully eradicate the unknown virus, but mitigates its damaging effects.

The unknown virus may be classified as major (e.g., joke, Trojan, virus, spyware . . . ) or minor (e.g., cleanable viruses, OverWrite, macro, worm, mass mailing, system clean , , , ). Note that what constitutes to be a major or minor virus will depend on implementation. Actions that may be taken depending on whether the unknown virus is suspected to be major or minor may include blocking outgoing port scanning, blocking outgoing emails and file transfers, lowering the CPU operating speed, and so on. Generic pattern 329 may indicate what action to take depending on whether the unknown virus is suspected to be a major type virus or a minor type virus. For example, if the unknown virus fits the general signature of a Trojan, generic pattern 329 may specify blocking the scanning of all or certain outgoing ports. Additional actions that may be specified in generic pattern 329 may include those performed by shelter code 326 further described below. For example, the generic pattern may indicate triggering of shelter code 326 when the unknown virus matches the general pattern of a major or minor virus. It is to be noted that depending on implementation, shelter code 326 may be triggered before or after receiving and using a generic pattern. Shelter code 326 may be used together with or independent of using a generic pattern. That is, shelter code 326 may be a separate response against an unknown virus.

Shelter code 326 may be configured to increase a security level of computer 115 in response to a triggering event indicative of a presence of a virus. Advantageously, the increased security level protects important components of the computer. In one embodiment, the important components of a computer are those that are critical to the computer's operation and those that are deemed important by the user (e.g., confidential files, work product). In one embodiment, a user may designate what she deems as "important components" by specifying the components using user interface 328. For example, a user may specify certain files (e.g., system files 331, data files 332, program files 334), directory, or folders as important. In that case, shelter code 326 may be configured to prevent access to those components or render them as "read-only" in response to a triggering event. Shelter code 326 may also be configured to block access to particular network ports 337 except for data coming from a pre-designated sender, such as those from support computer 120. This advantageously allows antidotes to be delivered over the Internet while the computer is shielded. Note that antidotes may also be delivered by way of removable computer-readable storage medium if need be. Shelter code 326 may also be configured to perform any or all of the following actions in response to a triggering event: lock all or portions of the system registry; quarantine suspicious e-mails 334 (e.g., segregating e-mails from unidentified senders for later virus scanning); increase the security level of web browser 336; restrict access to certain storage area 335, and so on. Shelter code 326 may leave computer 115 at the increased security level until after an antidote is received and administered (i.e., using the antidote to find and purge the virus), after the user manually sends a command to lower the security level, or after a notification from support server computer 120 that there is no virus threat, for example.

Figure 4:
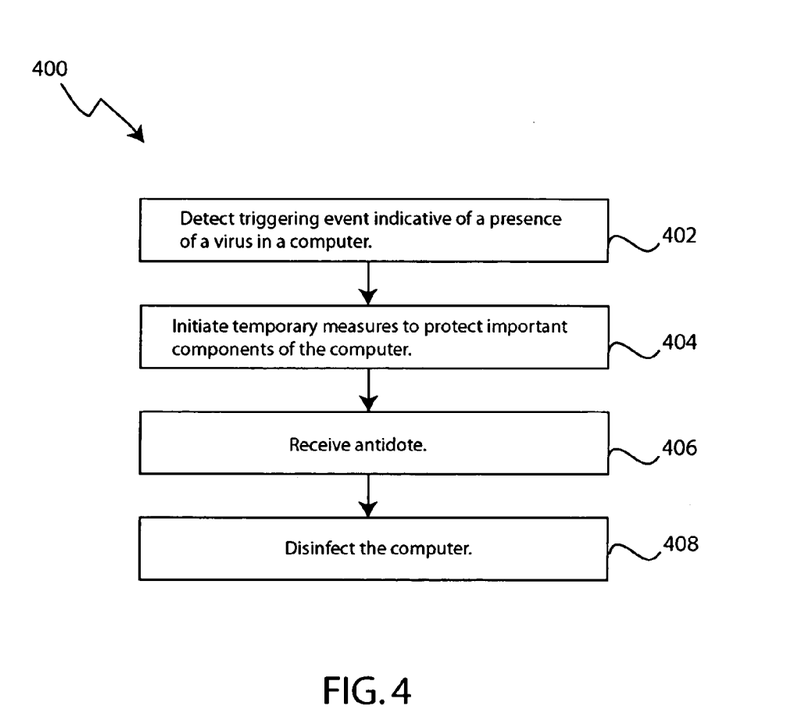
FIG. 4 shows a flow diagram of a method of securing a computer against a virus in accordance with an embodiment of the present invention.

FIG. 4 shows a flow diagram of a method 400 of securing a computer against a virus in accordance with an embodiment of the present invention. Method 400 may be performed using the components shown in FIG. 3. However, other components may also be used without detracting from the merits of the present invention. Method 400 may be implemented in software using computer-readable program code, in hardware using an integrated circuit (e.g. ASIC), or in firmware using non-volatile memory (e.g. ROM).

In step 402, a triggering event indicative of a presence of a virus in a computer is detected by an antivirus program, the virus being of a type not recognized by the antivirus program. That is, the antivirus program needs a new antidote to effectively combat the virus. For example, the virus may be of a type not covered by algorithms of an antivirus engine of the antivirus program, or of a type having a pattern not included in a pattern file of the antivirus program. Although the antivirus program may not be able to particularly identify or remove the virus, the triggering event alerts the antivirus program of the presence of the virus. The triggering event may be a notification received by the antivirus program from an antivirus research laboratory support computer, a command manually initiated by a user, or a condition (e.g., unexpected access to a file serving as a honey pot, generic pattern indicates presence of a virus) automatically detected by the antivirus program, for example.

In step 404, the antivirus program initiates temporary measures to secure the computer and thereby protect the computer's important components prior to receiving an antidote (i.e., a permanent solution) for the virus. The important components may be predetermined, such as designated system files, data files, program files, e-mails, storage area, and the like. The temporary measures may include using a generic pattern received from an antivirus research laboratory subsequent to the virus attack and/or triggering a shelter code. A shelter code of the antivirus program may be employed to limit or restrict access to the aforementioned important components. The shelter code may also increase the security level of a web browser as part of securing the computer. The shelter code advantageously minimizes possible damage to the computer prior to receiving the antidote. In other words, the shelter code protects the computer while the antivirus program does not have the requisite antidote to directly deal with the virus.

In step 406, the antivirus program receives an antidote for the virus. The antidote may be an update to the antivirus engine or pattern file of the antivirus program. The antidote may include a new algorithm or pattern for ultimately detecting and removing the virus. The antidote may be received over a computer network, such as the Internet, or by way of a removable computer-readable storage medium, for example.

In step 408, the antivirus program employs the antidote to disinfect the computer. Disinfecting the computer may include scanning the computer to determine if it has a virus in the first place, and removing identified viruses from the computer. The antivirus program may place the computer in a normal security level after the computer is disinfected. To allow for location and removal of viruses, the antivirus program may also lower the security level of selected components while that component is being disinfected.

Figure 5:
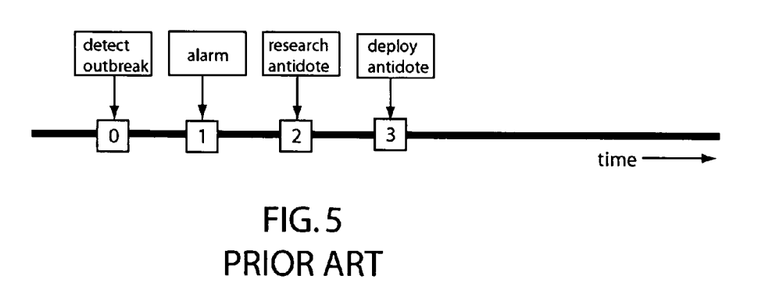
FIG. 5 shows a timeline for combating a virus outbreak.

As can be appreciated from the foregoing, embodiments of the present invention allow a computer to be secured against an unknown virus while an antidote is being developed. This is in marked contrast to conventional approaches to virus outbreaks, such as that illustrated in the timeline of FIG. 5. In FIG. 5, a virus outbreak is detected at time 0, an alarm that there is a virus outbreak is raised at time 1, an antidote is researched at time 2, and an antidote is deployed to combat the virus at time 3. The time period between researching the antidote to deploying the antidote may take as much as 45 minutes, which is more than enough time to cause great damage to the computer. In the timeline of FIG. 5, the computer is left vulnerable until the antidote is deployed.

Figure 6:
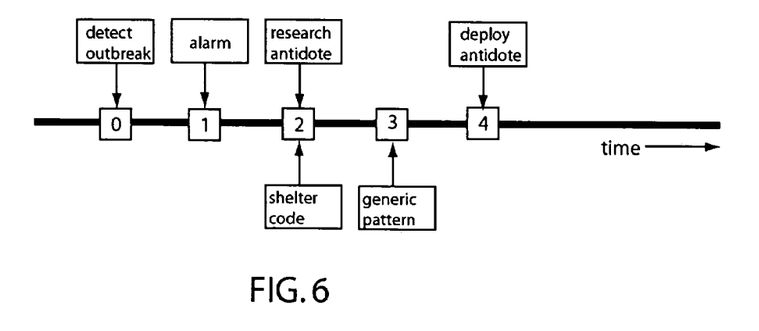
FIG. 6 shows a timeline for combating a virus outbreak in accordance with an embodiment of the present invention.

FIG. 6 shows a timeline for combating a virus outbreak in accordance with an embodiment of the present invention. In FIG. 6, a virus outbreak is detected at time 0, an alarm (e.g., a triggering event) that there is a virus outbreak is raised at time 1, an antidote to the virus is researched at time 2, and an antidote to combat the virus is deployed at time 4. Measures to secure the computer are taken at time 2 and/or time 3, when a shelter code is triggered and/or a generic pattern is deployed, respectively. This advantageously secures the computer before the antidote is deployed. The timeline of FIG. 6 is similar to the way infectious diseases may be treated in real life. For example, once an unknown infectious disease is detected, the World Health Organization may recommend precautionary measures before a cure is found. The precautionary measures typically do not eradicate the disease, but help slow the spread of the disease.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a computer having an antivirus mechanism, the method comprising:
   detecting a triggering event indicative of a presence of a virus in the computer, the virus being of a type not recognized by the antivirus mechanism employed by the computer; and
   in response to the triggering event, increasing a security level of the computer to protect an important component of the computer before an antidote is delivered to the computer.

2. The method of claim 1 wherein the triggering event comprises an unexpected access to a system file.

3. The method of claim 2 wherein the system file comprises a registry.

4. The method of claim 1 wherein the triggering event comprises a virus outbreak notification received over a computer network.

5. The method of claim 1 wherein the triggering event comprises a virus outbreak notification received over the Internet.

6. The method of claim 1 wherein the triggering event is manually activated by a user.

7. The method of claim 1 wherein the triggering event is automatically detected in the computer.

8. The method of claim 7 wherein the triggering event is automatically detected in the computer by monitoring for unexpected access to a file serving as bait for computer viruses.

9. The method of claim 7 wherein the triggering event is automatically detected in the computer by monitoring for unexpected access to a portion of a registry.

10. The method of claim 1 wherein increasing the security level of the computer comprises restricting access to a system registry.

11. The method of claim 1 wherein increasing the security level of the computer comprises increasing a security level of a web browser.

12. The method of claim 1 wherein increasing the security level of the computer comprises restricting access to a storage location of the computer.

13. The method of claim 1 wherein increasing the security level of the computer comprises restricting access to a network port of the computer.

14. The method of claim 1 wherein increasing the security level of the computer comprises putting an email into quarantine.

15. The method of claim 1 wherein increasing the security level of the computer comprises receiving data only from designated sources on the Internet.

16. A computer comprising:
   a memory, and a hardware processor running computer readable program code stored in the memory, the memory storing a pattern file comprising patterns of known viruses;

an antivirus engine configured to scan data using the pattern file;

and shelter code configured to increase a security level of the computer in response to a triggering event detected in the computer and indicative of a presence of a virus in the computer, the virus being of a type not recognized by the antivirus engine.

17. The computer of claim 16 wherein the shelter code is configured to increase the security level of the computer prior to receiving an antidote in the computer.

18. The computer of claim 16 wherein the triggering event comprises detection of unexpected access to a system file.

19. The computer of claim 16 wherein the triggering event comprises detection of unexpected access to a system registry.

20. The computer of claim 16 wherein the triggering event comprises detection of unexpected access to a file configured as a bait for computer viruses.

21. The computer of claim 16 further comprising:
a user interface configured to allow a user to manually generate the triggering event.

22. The computer of claim 16 wherein the triggering event comprises a virus outbreak notification received over the Internet.

23. The computer of claim 16 wherein the shelter code is configured to increase a security level of a web browser in response to the triggering event.

24. The computer of claim 16 wherein the shelter code is configured to restrict access to a predetermined file in response to the triggering event.

25. The computer of claim 16 wherein the shelter code is configured to block access to a predetermined network port in response to the triggering event.

26. A method of securing a computer against a virus, the method comprising:
triggering a shelter code to secure a predetermined important component of a computer upon detection in the computer of a possible virus that is of a type not included in a pattern file of an antivirus engine in the computer.

27. The method of claim 26 wherein the antivirus engine, the shelter code, and the pattern file are part of an antivirus program.

28. The method of claim 26 wherein the important component comprises a system registry.

29. The method of claim 26 wherein the important component comprises a network port.

30. The method of claim 26 further comprising:
receiving an antidote over the Internet;
scanning the computer for viruses; and
placing the computer in a normal security level.

31. The method of claim 26 wherein the shelter code is manually triggered by a user.

32. The method of claim 26 further comprising:
receiving a generic pattern in the computer prior to receiving an antidote.

33. A method of combating a computer virus outbreak, the method comprising:
detecting an unknown virus in a computer, the virus being of a type not recognized by an antivirus program in the computer;
raising an alarm in response to detecting the unknown virus;
developing an antidote to combat the unknown virus; and
prior to receiving the antidote in the computer, securing the computer against the unknown virus.

34. The method of claim 33 wherein securing the computer comprises:
triggering a shelter code to increase a security level of the computer; and
receiving a generic pattern in the computer, the generic pattern including a general signature of the unknown virus and instructions for securing the computer against the unknown virus.

35. The method of claim 33 wherein securing the computer comprises:
triggering a shelter code to increase a security level of the computer.

36. The method of claim 33 wherein securing the computer further comprises:
receiving a generic pattern in the computer, the generic pattern including a general signature of the unknown virus.

* * * * *